(12) United States Patent
Fujii

(10) Patent No.: US 12,384,281 B2
(45) Date of Patent: Aug. 12, 2025

(54) HEATER UNIT AND VEHICULAR SEAT

(71) Applicant: KURABE INDUSTRIAL CO., LTD., Hamamatsu (JP)

(72) Inventor: Hirotaka Fujii, Hamamatsu (JP)

(73) Assignee: KURABE INDUSTRIAL CO., LTD., Hamamatsu (JP)

( * ) Notice: Subject to any disclaimer, the term of this patent is extended or adjusted under 35 U.S.C. 154(b) by 148 days.

(21) Appl. No.: 18/260,887

(22) PCT Filed: Jan. 6, 2022

(86) PCT No.: PCT/JP2022/000271
§ 371 (c)(1),
(2) Date: Jul. 10, 2023

(87) PCT Pub. No.: WO2022/153919
PCT Pub. Date: Jul. 21, 2022

(65) Prior Publication Data
US 2024/0059198 A1   Feb. 22, 2024

(30) Foreign Application Priority Data

Jan. 12, 2021  (JP) ................. 2021-002905
Jan. 12, 2021  (JP) ................. 2021-002906
(Continued)

(51) Int. Cl.
*H05B 3/34* (2006.01)
*B60N 2/56* (2006.01)
*F24H 3/04* (2022.01)

(52) U.S. Cl.
CPC .................. *B60N 2/5685* (2013.01)

(58) Field of Classification Search
CPC .. B60N 2/5685; B60N 2/5628; B60N 2/5635; H05B 2203/003; H05B 2203/014; H05B 2203/017; H05B 2203/029
See application file for complete search history.

(56) References Cited

U.S. PATENT DOCUMENTS 3,627,988 A * 12/1971 Romaniec ............... F24D 13/02
                                                          252/502
8,544,942 B2 * 10/2013 Lazanja ................. A47C 7/748
                                                          219/217

(Continued)

FOREIGN PATENT DOCUMENTS

JP     H0668964 A     3/1994
JP     H08507404 A    8/1996
(Continued)

OTHER PUBLICATIONS

ISA Japan Patent Office, International Search Report Issued in Application No. PCT/JP2022/000271, Feb. 15, 2022, WIPO, 4 pages.

*Primary Examiner* — Shin H Kim
(74) *Attorney, Agent, or Firm* — McCoy Russell LLP

(57) ABSTRACT

Conventional heater units have a problem in that both ventilation characteristics and mechanical strength cannot be satisfied at the same time. A heater unit includes a base material and a cord-shaped heater, the cord-shaped heater being disposed on and fixed to the base material, in which the base material is made by combining a structural yarn that is disposed in an approximately planar shape and a nonwoven fabric with each other, and the cord-shaped heater is fixed in direct contact with the structural yarn.

9 Claims, 6 Drawing Sheets

(30) Foreign Application Priority Data

Jan. 29, 2021 (JP) .................................. 2021-012569
Jan. 29, 2021 (JP) .................................. 2021-012570

(56) References Cited

U.S. PATENT DOCUMENTS

| | | | |
|---|---|---|---|
| 8,702,164 B2* | 4/2014 | Lazanja .................... | H05B 3/36 |
| | | | 219/217 |
| 9,657,963 B2* | 5/2017 | Lazanja .................... | H05B 3/36 |
| 9,963,056 B2* | 5/2018 | Ishiyama .............. | B60N 2/5685 |
| 2003/0111454 A1 | 6/2003 | Ishiyama et al. | |
| 2003/0213797 A1 | 11/2003 | Yoneyama et al. | |
| 2008/0223844 A1* | 9/2008 | Cronn .................... | H05B 3/342 |
| | | | 36/2.6 |
| 2011/0226751 A1* | 9/2011 | Lazanja ................. | A47C 7/748 |
| | | | 219/217 |
| 2012/0091112 A1* | 4/2012 | Wei ...................... | B60N 2/5685 |
| | | | 219/202 |
| 2013/0106147 A1* | 5/2013 | Lazanja .................... | H05B 3/36 |
| | | | 297/180.12 |
| 2014/0187140 A1* | 7/2014 | Lazanja ................ | F24H 3/0411 |
| | | | 219/528 |
| 2016/0236598 A1 | 8/2016 | Hoshi | |
| 2018/0279416 A1* | 9/2018 | Sajic .................... | H05B 1/0272 |
| 2021/0321491 A1* | 10/2021 | Hagihara .................. | B32B 7/12 |
| 2024/0059198 A1* | 2/2024 | Fujii ....................... | H05B 3/56 |

FOREIGN PATENT DOCUMENTS

| | | |
|---|---|---|
| JP | 2005285602 A | 10/2005 |
| JP | 3991750 B2 | 10/2007 |
| JP | 4202071 B2 | 12/2008 |
| JP | 4999455 B2 | 8/2012 |
| JP | 2015074375 A | 4/2015 |
| JP | 2017157279 A | 9/2017 |
| JP | 6636825 B2 | 1/2020 |
| WO | 9409684 A1 | 5/1994 |

* cited by examiner

HEATER UNIT AND VEHICULAR SEAT

CROSS REFERENCE TO RELATED APPLICATIONS

The present application is a U.S. National Phase of International Application No. PCT/JP2022/000271 entitled "HEATER UNIT AND VEHICULAR SEAT," and filed on Jan. 6, 2022. International Application No. PCT/JP2022/000271 claims priority to Japanese Patent Application No. 2021-002905 filed on Jan. 12, 2021, and to Japanese Patent Application No. 2021-002906 filed on Jan. 12, 2021, and to Japanese Patent Application No. 2021-012569 filed on Jan. 29, 2021, and to Japanese Patent Application No. 2021-012570 filed on Jan. 29, 2021.The entire contents of each of the above-listed applications are hereby incorporated by reference for all purposes.

TECHNICAL FIELD

The present invention relates to a heater unit that is suitably usable in an electric blanket, an electrically heated carpet, a car seat heater, and the like and, in particular, to a heater unit with superior ventilation characteristics and mechanical strength.

BACKGROUND

Conventionally, as a heater unit to be mounted to a vehicular seat to serve as a car seat heater, for example, there is a heater unit configured such that a cord-shaped heater in which a thermal fusion bonding portion is provided on a base material is wired in a serpentine manner and the base material and the thermal fusion bonding portion are bonded and fixed by thermal fusion bonding due to heating and pressurization (for example, refer to Patent Literature 1). In addition, in recent years, vehicular seats with a built-in air-conditioning apparatus are being put to practical use as means to further improve comfortableness of an interior environment of a vehicle. Specifically, a vehicular seat is known in which, by imparting ventilation characteristics to a heater unit and a seat cover to send air to a cover side through a ventilation flue formed inside the seat, air is blown out from a surface of the vehicular seat (for example, refer to Patent Literature 2).

As a heater unit to be applied to a vehicular seat with the built-in air-conditioning apparatus described above, a heater unit with particularly superior ventilation characteristics is required. Therefore, known methods of improving ventilation characteristics include using, as a base material of the heater unit, a base material in which a plurality of through-holes are formed, a base material made of a material with superior ventilation characteristics such as a spunbonded nonwoven fabric or a spunlaced nonwoven fabric, and a base material having a mesh structure (refer to Patent Literature 3 to 7).

CITATION LIST

Patent Literature

Patent Literature 1: Japanese Patent No. 4202071: Kurabe Industrial Co., Ltd.
Patent Literature 2: Japanese Patent No. 4999455: Kurabe Industrial Co., Ltd.
Patent Literature 3: Japanese Patent No. 3991750: Matsushita Electric Industrial Co., Ltd.
Patent Literature 4: Japanese Unexamined Patent Application Publication No. 2005-285602: Matsushita Electric Industrial Co., Ltd.
Patent Literature 5: Published Japanese Translation of PCT International Publication for Patent Application, No. H8-507404: Scandmec AB
Patent Literature 6: Japanese Unexamined Patent Application Publication No. 2015-74375: TS TECH CO., LTD.
Patent Literature 7: Japanese Patent No. 6636825: Kurabe Industrial Co., Ltd.

SUMMARY

Technical Problem

However, with the base materials of the heater units described in Patent Literatures 3 to 6 described above, there is a significant drop in mechanical strength in return for ventilation characteristics. In particular, while heater units to be applied to a vehicular seat are repetitively subject to loads due to a driver or the like sitting on and alighting from the vehicular seat, there has not been a vehicular seat with characteristics sufficient enough to prevent deformation or fracture even with respect to such loads. In addition, with a base material in which a plurality of through-holes are formed, since there is only a slight improvement in ventilation characteristics, a further improvement in ventilation characteristics is required.

The heater unit described in Patent Literature 7 described above solves the problems of the heater units described in Patent Literatures 3 to 6. However, a further improvement in ventilation characteristics is required and there is a demand to reduce density (basis weight) of a nonwoven fabric. As a result, mechanical strength and stiffness as a base material decline and fracture and deformation are more likely to occur. Deformation of the base material makes work difficult when, for example, arranging the heater unit in a vehicular seat and may even result in the heater unit being arranged in places not originally intended by design. Therefore, there is a need to further improve mechanical strength or stiffness as a heater unit.

The present invention has been made in order to solve such problems in related art and an object thereof is to provide a heater unit with superior ventilation characteristics and mechanical strength.

Solution to Problem

In order to achieve the object described above, a heater unit according to the present invention includes a base material and a cord-shaped heater, the cord-shaped heater being disposed on and fixed to the base material, in which the base material is made by combining a structural yarn that is disposed in an approximately planar shape and a nonwoven fabric with each other, and the cord-shaped heater is fixed in direct contact with the structural yarn.

In addition, conceivably, a thermal fusion bonding portion is formed on an outermost layer of the cord-shaped heater, and the thermal fusion bonding portion is fixed to the nonwoven fabric and the structural yarn by thermal fusion bonding.

In addition, conceivably, the structural yarn is woven, or knitted, or parallel alignments of the structural yarn in different directions are stacked and an opening portion larger than an apparent diameter of the structural yarn is provided.

In addition, conceivably, the base material is made of a structural yarn and a pair of a nonwoven fabric, and the structural yarn is sandwiched by the pair of the nonwoven fabric.

In addition, a vehicular seat according to the present invention has a seat cover and a seat pad, and the heater unit described above is arranged between the seat cover and the seat pad.

In addition, a heater unit according to the present invention includes a base material and a cord-shaped heater, the cord-shaped heater being disposed on and fixed to the base material, in which the base material is made by combining a plurality of structural yarns that are disposed in an approximately planar shape and a nonwoven fabric with each other, the plurality of structural yarns are made up of at least a first structural yarn group that is linearly disposed with respect to a predetermined direction and a second structural yarn group that is linearly disposed with respect to a direction different from the direction of the first structural yarn group, the cord-shaped heater is disposed on the base material in a serpentine shape created by a combination of linear portions and curved portions, and the linear portions of the cord-shaped heater are arranged so as to assume an angle that differs from the angles of the first structural yarn group and the second structural yarn group.

In addition, conceivably, the structural yarn is woven or parallel alignments of the structural yarn in different directions are stacked and an opening portion larger than an apparent diameter of the structural yarn is provided.

In addition, conceivably, the base material is made of a structural yarn and a pair of a nonwoven fabric, and the structural yarn is sandwiched by the pair of the nonwoven fabric.

In addition, conceivably, a thermal fusion bonding portion is formed on an outermost layer of the cord-shaped heater, and the thermal fusion bonding portion is fixed to the nonwoven fabric and the structural yarn by thermal fusion bonding.

In addition, a vehicular seat according to the present invention has a seat cover and a seat pad, and the heater unit described above is arranged between the seat cover and the seat pad.

Advantageous Effect of Invention

Generally, while reducing an amount of fiber per a unit area of a base material is effective in improving ventilation characteristics, the reduction in the amount of fiber also significantly lowers mechanical strength and stiffness of the base material. With the heater unit according to the present invention, tensile strength is produced due to a structural yarn disposed in an approximately planar shape. Therefore, the base material with improved ventilation characteristics can have superior mechanical strength.

Furthermore, due to the thermal fusion bonding portion and the structural yarn being directly fixed, separation of the cord-shaped heater due to fiber loss from the nonwoven fabric can be prevented. In addition, since the cord-shaped heater and the structural yarn are to be tightly integrated, an effect of making the heater unit less likely to deform can be produced.

Furthermore, setting a direction of the structural yarn and a direction of the linear portions of the cord-shaped heater at different angles also enables the cord-shaped heater to contribute towards retaining the shape of the base material.

DETAILED DESCRIPTION

Hereinafter, embodiments of the present invention will be described with reference to the drawings. The embodiments represent examples which assume that the present invention is to be applied to a vehicular seat heater.

Figure 3:
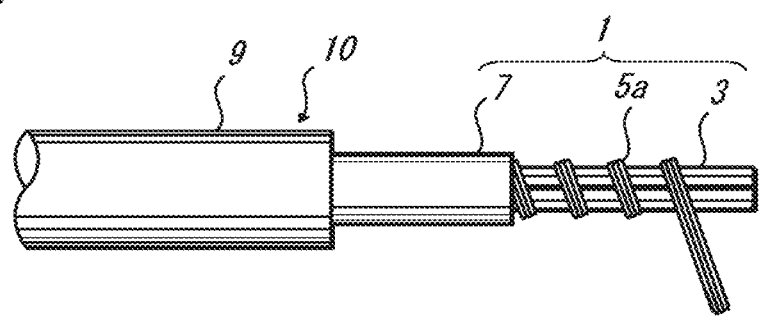
FIG. 3 is a diagram showing an embodiment of the present invention being a partial cutaway side view showing a configuration of a cord-shaped heater.

First, a configuration of a cord-shaped heater 10 according to the present first embodiment will be described. The cord-shaped heater 10 according to the present embodiment is configured as shown in FIG. 3. First, there is a heater core 3 made of an aromatic polyamide fiber bundle with an outer diameter of approximately 0.2 mm, and six paralleled conductor strands 5a made of a copper alloy wire (TH-SNCC-3) with a strand diameter of 0.08 mm and containing tin plating hard tin are spirally wound around an outer circumference of the heater core 3 at a pitch of approximately 0.7 mm. Tetrafluoroethylene-hexafluoropropylene copolymer (FEP) as an insulator layer 7 is extruded at a thickness of approximately 0.15 mm to coat an outer circumference of the conductor strands 5a wound around the heater core 3 to construct a heating wire 1. A polyester resin containing a flame retardant is extruded as a thermal fusion bonding portion 9 at a thickness of 0.2 mm to coat an outer circumference of the heating wire 1. The cord-shaped heater 10 is configured in this manner and has a finished outer diameter of 1.1 mm. While the heater core 3 described above is effective when flexibility and tensile strength are taken into consideration, a plurality of paralleled or twisted heating element wires may conceivably be used in place of the heater core 3. Preferably, the cord-shaped heater 10 has sufficient flame retardancy to pass the Horizontal Flame Test of UL 1581, Fourth Edition, dated 2008 by itself since such flame retardancy enables flame retardancy of the heater unit to be improved.

Figure 2:
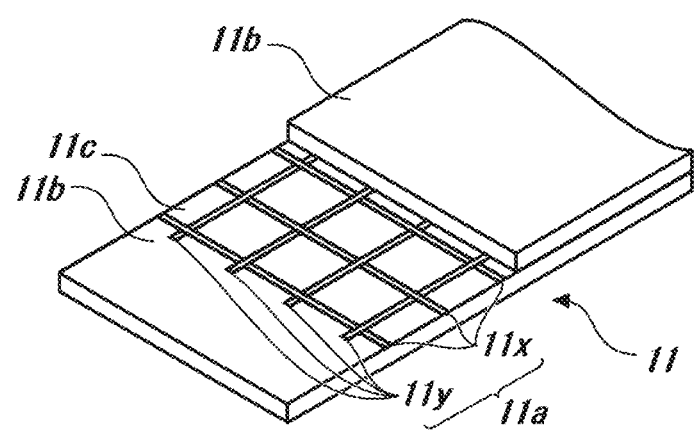
FIG. 2 is a diagram showing an embodiment of the present invention being a partial cutaway perspective view showing a configuration of a base material.

Next, a configuration of a base material 11 to which the cord-shaped heater 10 configured as described above is bonded and fixed will be described. As shown in FIG. 2, in the base material 11 according to the present embodiment, a structural yarn 11a is sandwiched between a pair of nonwoven fabric 11b and pasted by an adhesive. For example, the nonwoven fabric 11b is a nonwoven fabric made of flame-retardant polyester fiber with a basis weight of 27 g/m$^2$ and an apparent thickness of about 1 mm. In this case, the structural yarn 11a is a polyester multifilament with an apparent diameter of 0.5 mm. In addition, in the base material 11, the structural yarn 11a is plain-woven at a grid spacing of 10 mm, a size of the opening portion 11c being 9.5 mm, and a shielding ratio being 12.9%. Furthermore, the structural yarn 11a is made up of a first structural yarn group 11x that is linearly disposed in a left-right direction in FIG. 2 and a second structural yarn group 11y that is linearly arranged in a front-rear direction in FIG. 2. The nonwoven fabric is obtained by spinning a material that constitutes fibers by melt extrusion and stacking the material to form a web, and is made of filaments (long fibers). The structural yarn 11a is sandwiched between a pair of such nonwoven fabric 11b, and the structural yarn 11a and the nonwoven fabric 11b are fixed by an adhesive. Intersections where different structural yarns 11a intersect with each other are also fixed by an adhesive. The base material 11 configured as described above has a basis weight of 100 g/m$^2$ as a whole.

Figure 4:
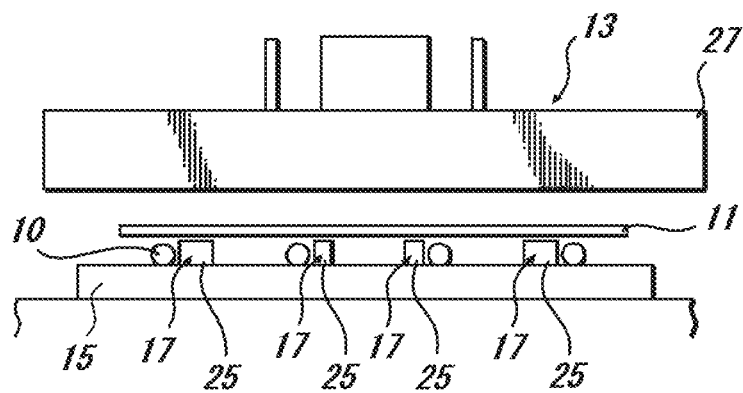
FIG. 4 is a diagram showing an embodiment of the present invention being a diagram showing a configuration of a hot press-type heater production apparatus.
Figure 5:
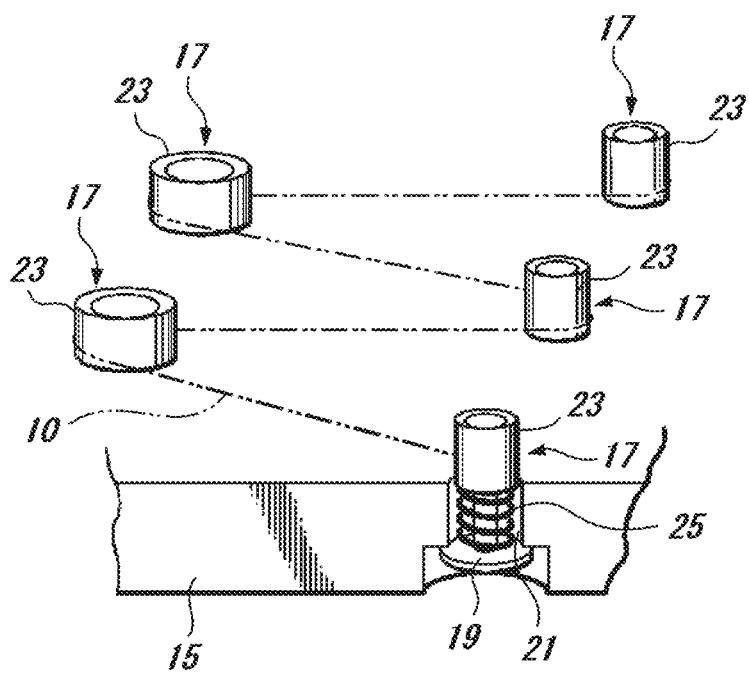
FIG. 5 is a diagram showing an embodiment of the present invention being a partial perspective view showing how the cord-shaped heater is arranged in a predetermined pattern and shape.

Next, a configuration in which the cord-shaped heater 10 described above is arranged on the base material 11 in a serpentine shape to be bonded and fixed will be described. In the present embodiment, a serpentine spacing is set to 20 mm. FIG. 4 is a diagram showing a configuration of a hot press-type heater production apparatus 13 for bonding and fixing the cord-shaped heater 10 onto the base material 11. First, there is a hot press jig 15 and a plurality of locking mechanisms 17 are provided on the hot press jig 15. As shown in FIG. 5, the locking mechanisms 17 are provided with a pin 19 and the pin 19 is inserted from below into a hole 21 drilled into the hot press jig 15. A locking member 23 is mounted to an upper part of the pin 19 so as to be movable in an axial direction and is constantly biased upward by a coil spring 25. In addition, as indicated by a virtual line in FIG. 5, the cord-shaped heater 10 is to be arranged in a serpentine shape by being hooked on the locking members 23 of the plurality of locking mechanisms 17.

Returning to FIG. 4, a press hot plate 27 is arranged so as to be ascendible and descendible above the plurality of locking mechanisms 17. In other words, the cord-shaped heater 10 is arranged in a serpentine shape by being hooked on the locking members 23 of the plurality of locking mechanisms 17, and the base material 11 is placed on top of the cord-shaped heater 10. The press hot plate 27 is lowered in this state to subject the cord-shaped heater 10 and the base material 11 to heating and pressurization at 230° C. for 5 seconds. Accordingly, the thermal fusion bonding portion 9 on the side of the cord-shaped heater 10 and thermally fusible fibers on the side of the base material 11 are to be thermally fused and, as a result, the cord-shaped heater 10 and the base material 11 are to be bonded and fixed to each other. During heating and pressurization due to the descent of the press hot plate 27, the locking members 23 of the plurality of locking mechanisms 17 are to move downward against a biasing force of the coil spring 25.

Figure 6:
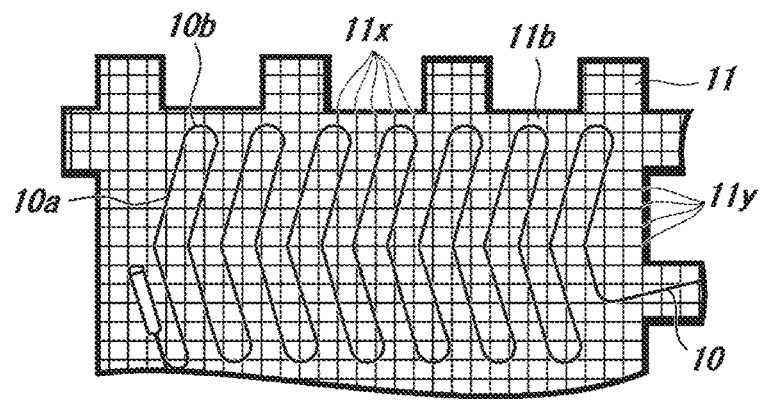
FIG. 6 is a diagram showing an embodiment of the present invention being an enlarged plan view showing a part of the heater unit by making the base material transparent.

As shown in FIG. 6, the serpentine shape of the cord-shaped heater 10 is constructed by combining linear portions 10a and curved portions 10b with each other. In doing so, the linear portions 10a of the cord-shaped heater 10 are preferably arranged to be at an angle that differs from the angles of the first structural yarn group 11x and the second structural yarn group fly as in the present embodiment. As the mechanical strength of the base material 11, while the base material 11 is strong in a direction in which the structural yarn 11a is arranged, with respect to tension at an angle that differs from the direction in which the structural yarn 11a is arranged, the base material 11 becomes more deformable as the angle changes. In particular, when the first structural yarn group 11x and the second structural yarn group fly are orthogonal to each other as in the present embodiment, deformability is highest with respect to tension at an angle that deviates from the first structural yarn group 11x by 45 degrees. By arranging the linear portions 10a of the cord-shaped heater 10 at an angle that differs from the angles of the first structural yarn group 11x and the second structural yarn group 11y, deformation is less likely to occur even with respect to tension at various angles. Note that the nonwoven fabric 11b of the base material 11 is shown as though transparent in FIG. 6.

An adhesion layer may be formed or a double-sided adhesive tape may be applied on a surface of the base material 11 on a side where the cord-shaped heater 10 is not arranged. This is done in order to fix the heater unit 31 to a seat when mounting the heater unit 31 to the seat.

Figure 1:
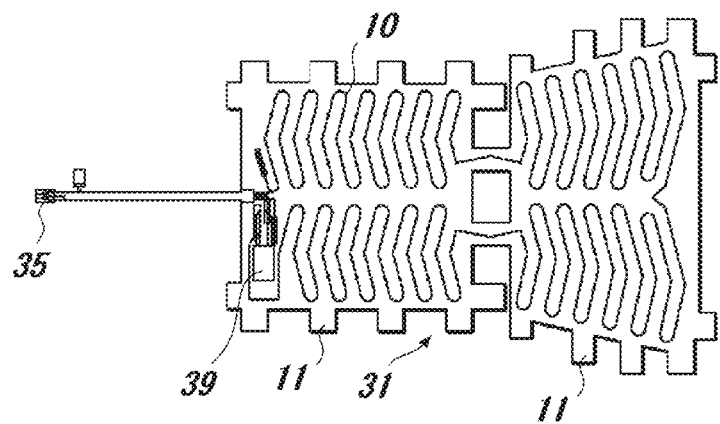
FIG. 1 is a diagram showing an embodiment of the present invention being a plan view showing a configuration of a heater unit.

By performing the operations described above, the heater unit 31 of a vehicular seat heater similar to that shown in FIG. 1 can be obtained. Note that a cord is connected to both ends of the cord-shaped heater 10 and a temperature control apparatus 39 in the heater unit 31, and the cord-shaped heater 10, the temperature control apparatus 39, and a connector 35 are connected by the cord. In addition, a connection with an electric system of a vehicle (not illustrated) is to be established via the connector 35.

Figure 8:
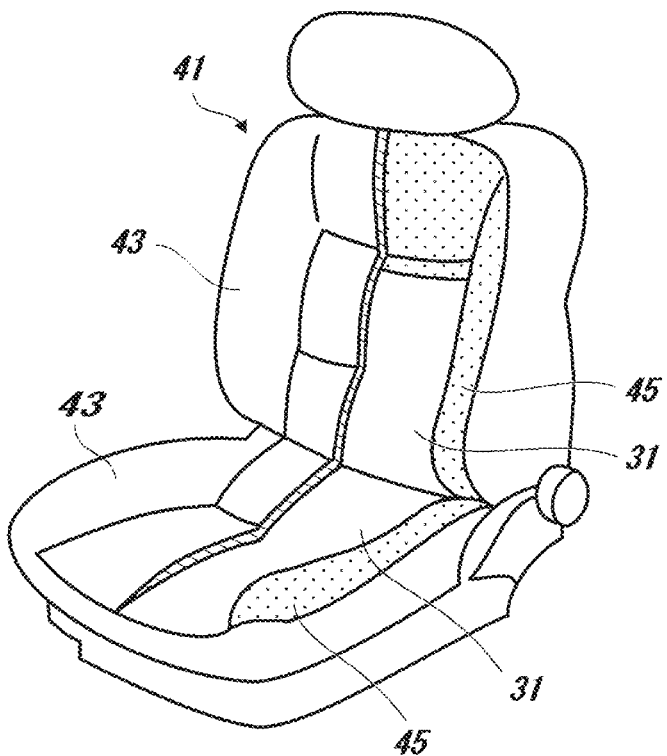
FIG. 8 is a diagram showing an embodiment of the present invention being a perspective view partially showing a part cutaway of how the heater unit is embedded in a vehicular seat.

Furthermore, the heater unit 31 configured as described above is embedded and arranged in a vehicular seat 41 in a state shown in FIG. 8. In other words, as described earlier, the heater unit 31 is to be bonded to a seat cover 43 or a seat pad 45 of the vehicular seat 41.

In the heater unit obtained as in the embodiment described above, due to the thermal fusion bonding portion 9 of the cord-shaped heater 10 penetrating into the nonwoven fabric 11b of the base material 11 and surrounding the fibers that make up the nonwoven fabric 11b, the cord-shaped heater 10 and the base material 11 are to be tightly bonded to each other. In particular, if the base material 11 includes thermally fusible fibers, the thermally fusible fibers have a sheath-core structure, and the sheath portion has a low melting point, the sheath portion and the thermal fusion bonding portion 9 of the cord-shaped heater are to be thermally fused and integrated with each other in a state where the core portion is surrounded. Accordingly, the cord-shaped heater 10 and the base material 11 are to be even more tightly bonded to each other.

Figure 7:
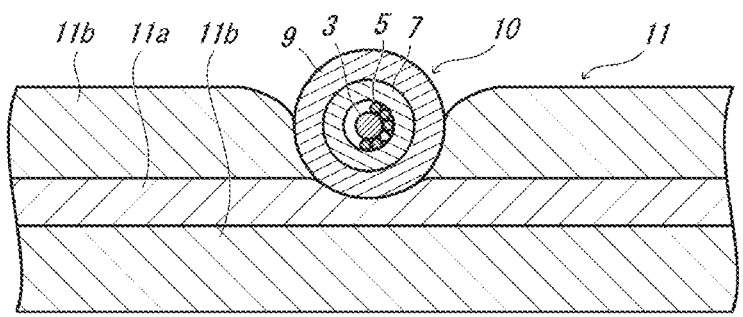
FIG. 7 is a diagram showing an embodiment of the present invention being an enlarged sectional view of a part of the heater unit.
Figure 14:
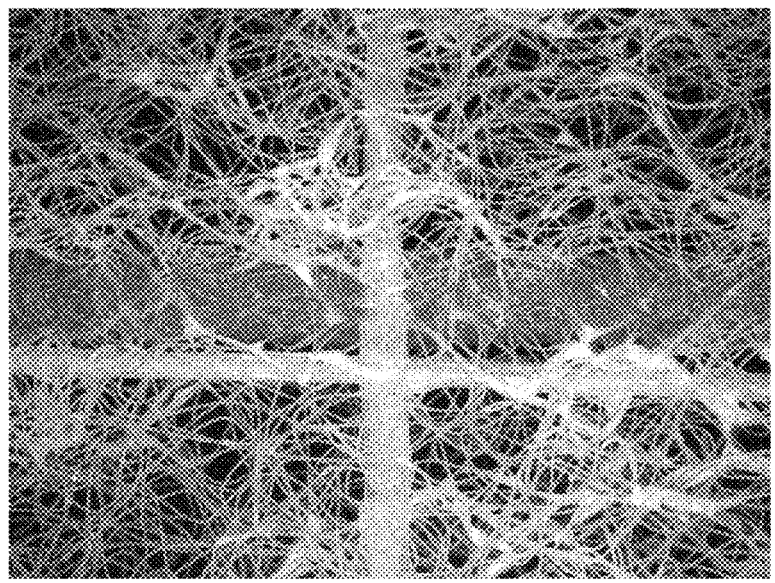
FIG. 14 is a photograph showing an embodiment of the present invention being an enlarged photograph showing characterizing parts of a heater unit.
Figure 15:
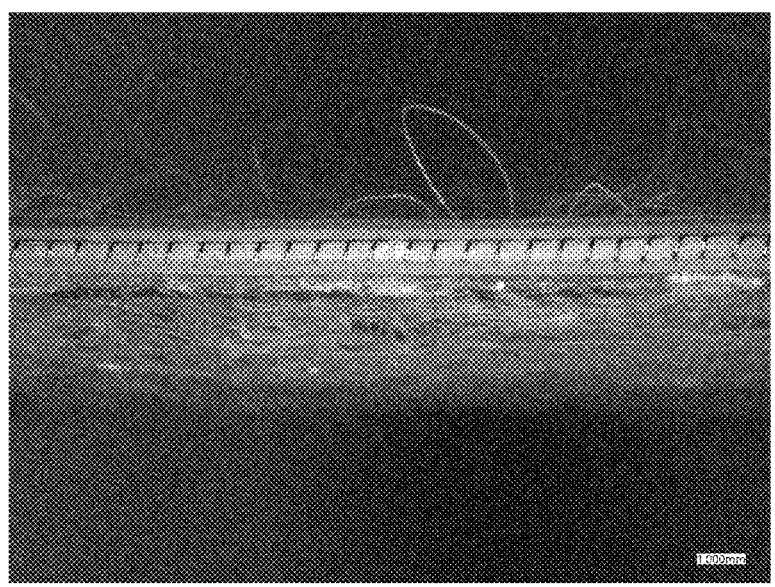
FIG. 15 is a photograph showing an embodiment of the present invention being an enlarged photograph of a sectional view of characterizing parts of a heater unit.

As in the enlarged sectional view shown in FIG. 7, preferably, the thermal fusion bonding portion 9 of the cord-shaped heater 10 penetrates beyond the nonwoven fabric 11b of the base material 11 until the thermal fusion bonding portion 9 comes into direct contact with the structural yarn 11a and the thermal fusion bonding portion 9 and the structural yarn 11a are fixed by thermal fusion bonding. Since improving ventilation characteristics of the base material 11 reduces density (basis weight) of the nonwoven fabric 11b of the base material 11, separation of the cord-shaped heater 10 due to fiber loss from the nonwoven fabric 11b is more likely to occur. Due to the thermal fusion bonding portion 9 and the structural yarn 11a being directly fixed, such separation can be prevented. In addition, since the cord-shaped heater 10 and the structural yarn 11a are to be tightly integrated, an effect of making the heater unit less likely to deform can also be produced. FIG. 14 and FIG. 15 show enlarged photographs of characterizing parts of the heater unit. FIG. 14 is a photograph of the heater unit taken from a surface of the base material which is opposite to the surface to which the cord-shaped heater is fixed. FIG. 15 is a photograph of a cross section of the heater unit created by cutting the heater unit along an orientation of the cord-shaped heater. Both FIG. 14 and FIG. 15 show that the thermal fusion bonding portion of the cord-shaped heater is surrounding the structural yarn and that the thermal fusion bonding portion and the structural yarn are fixed by thermal fusion bonding.

Figure 9:
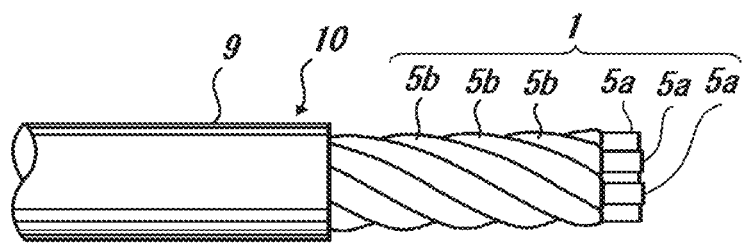
FIG. 9 is a diagram showing another embodiment of the present invention being a partial cutaway side view showing a configuration of a cord-shaped heater.
Figure 10:
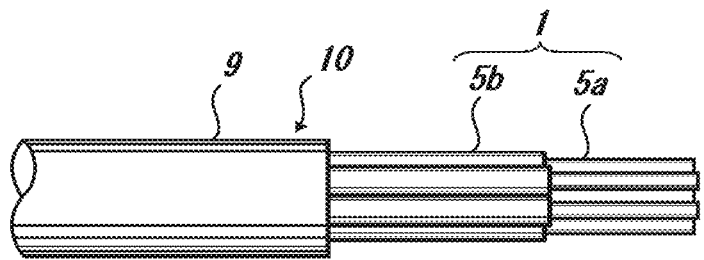
FIG. 10 is a diagram showing another embodiment of the present invention being a partial cutaway side view showing a configuration of a cord-shaped heater.
Figure 11:
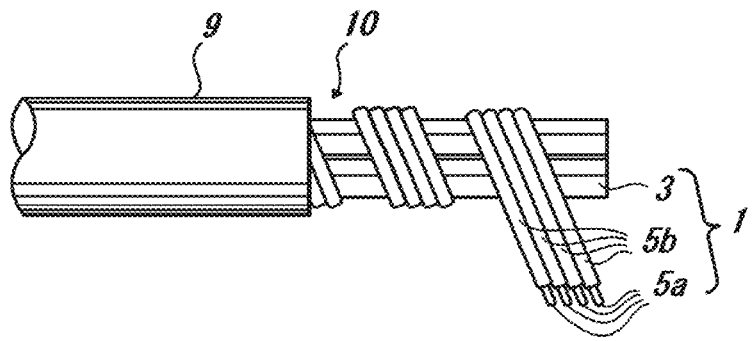
FIG. 11 is a diagram showing another embodiment of the present invention being a partial cutaway side view showing a configuration of a cord-shaped heater.

Note that the present invention is not limited to the embodiment described above. Various conventionally known cord-shaped heaters can be used as the cord-shaped heater 10. Examples of the configuration of the heating wire 1 include twisting or paralleling the conductor strand 5a in plurality, winding the conductor strands 5a around the heater core 3, and applying the insulator layer 7 on an outer circumference of the heater core 3 (refer to FIG. 3), twisting a plurality of the conductor strands 5a coated by an insulating film 5b (refer to FIG. 9), and paralleling a plurality of the conductor strands 5a coated by the insulating film 5b (refer to FIG. 10) as in the embodiment described above, twisting or paralleling the conductor strand 5a coated by the insulating film 5b in plurality and winding the conductor strands 5a around the heater core 3 (refer to FIG. 11), and intermittently forming the thermal fusion bonding portion 9 (refer to FIG. 12) as in the embodiment described above. In addition, a temperature sensing wire, a short-circuit detection wire, or the like may be bound together. Specific aspects among such other aspects will be described below. First, in a configuration such as that shown in FIG. 11, seven conductor strands 5a made of a tin-copper alloy wire with a strand diameter of 0.08 mm are paralleled and spirally wound at a pitch of 1 mm around an outer circumference of the heater core 3 made of an aromatic polyamide fiber bundle with an outer diameter of approximately 0.2 mm to construct the heating wire 1. Note that the conductor strands 5a are coated by the insulating film 5b made of polyurethane at a thickness of approximately 0.005 mm. A polyethylene resin containing a flame retardant is extruded as the thermal fusion bonding portion 9 at a thickness of 0.25 mm to coat an outer circumference of the heating wire 1. The cord-shaped heater 10 is configured in this manner and has a finished outer diameter of 0.9 mm.

Examples of the heater core 3 include fibers configured such that a core material thereof is a monofilament, a multifilament, a spun yarn of an inorganic fiber such as such as a glass fiber or an organic fiber such as polyester fibers such as polyethylene terephthalate, an aliphatic polyamide fiber, an aromatic polyamide fiber, or a wholly aromatic polyester fiber, or a fiber material thereof, or an organic polymeric material constituting a fiber material, and an circumference of the core material is coated with a thermoplastic organic polymeric material. In addition, making the heater core 3 heat-shrinkable and thermally fusible results in a core wire becoming fused and broken due to anomalous heating when the conductor strands 5a break, and contraction of the core wire causes the wound conductor strands 5a to follow the motion of the heater core 3 and results in the end portions of the broken conductor strands 5a becoming separated from each other. Therefore, situations where respective end portions of broken conductor strands come into contact with or become separated from each other or remain in contact over a small contact area such as point contact no longer occur and anomalous heat generation can be prevented. In addition, when a configuration in which the conductor strands 5a are insulated by the insulating film 5b is adopted, the heater core 3 need not necessarily be made of an insulation material. For example, a stainless steel wire or a titanium alloy wire can also be used. However, the heater core 3 is favorably made of an insulation material in consideration of a situation where the conductor strands 5a break.

Conventionally known conductor strands can be used as the conductor strands 5a and, for example, a copper wire, a copper alloy wire, a nickel wire, an iron wire, an aluminum wire, a nickel-chromium alloy wire, a copper-nickel alloy wire, an iron-chromium alloy wire, and a silver-containing copper alloy wire that contains a copper solid solution and a copper-silver eutectic in a fibrous state. In addition, conductor strands with various sectional shapes can be used and, in addition to those with a circular cross section which are normally used, so-called rectangular wires may also be used. However, when winding the conductor strands 5a around the heater core 3, a conductor strand with a small amount of springback when winding the heating wire 1 among those described above is favorable. For example, with a silver-containing copper alloy wire that contains a copper solid solution and a copper-silver eutectic in a fibrous state or the like, while high tensile strength characteristics and superior tensile strength and bending strength are achieved, there is a high likelihood of springback when winding the heating wire. Therefore, such a wire is unfavorable since floating of the conductor strands 5a or a fracture of the conductor strands 5a due to excessive winding tension is likely to occur when the wire is being wound around the heater core 3 and habitual twisting is likely to occur after processing. In particular, when adopting a mode in which the conductor strands 5a are coated with the insulating film 5b, a restoring force due to the insulating film 5b is to be additionally applied. Therefore, it is important to select a wire with a low restoration rate as the conductor strands 5a to compensate for the restoring force due to the insulating film 5b.

Conventionally known resin materials and the like can be used as the insulating film 5b to coat the conductor strands 5a, and examples of such resin materials include polyurethane resin, polyamide resin, polyimide resin, polyamide-imide resin, polyester-imide resin, nylon resin, polyester-nylon resin, polyethylene resin, polyester resin, vinyl chloride resin, fluorine resin, and silicone resin. A plurality of layers of these materials may be formed. Using a material with thermal fusibility among these materials is preferable since the conductor strands 5a can be thermally fused to each other and workability can be improved since the heating wire 1 does not become loosened when processing terminals such as for connection with a connecting terminal. In addition, when performing soldering as the processing of terminals, since workability increases significantly if the insulating film 5b is removed by heat during soldering, the material of the insulating film 5b preferably has good thermal decomposability.

When paralleling or twisting the conductor strands 5a described above and winding the conductor strands 5a around the heater core 3, paralleling is more preferable than twisting. This is because paralleling results in a smaller diameter of a cord-shaped heater 10 and also realizes a smooth surface. In addition to paralleling or twisting, the conductor strands 5a can conceivably be braided on the heater core 3.

When forming the insulator layer 7, the insulator layer 7 may be formed by extrusion or the like or the insulator layer 7 molded in a tube shape in advance may be overlaid and a method of formation is not particularly limited. A material constituting the insulator layer 7 may also be appropriately designed according to a usage mode or a usage environment of the cord-shaped heater and there is a wide variety of examples of the material constituting the insulator layer 7 including a polyethylene-based resin, a polyester-based resin, a polyurethane-based resin, a polyamide-based resin, vinyl chloride resin, a fluorine-based resin, synthetic rubber, fluoro-rubber, an ethylene-based thermoplastic elastomer, and an urethane-based thermoplastic elastomer. In addition, a protective coat may be further formed on the outer circumference of the insulator layer 7.

Figure 12:
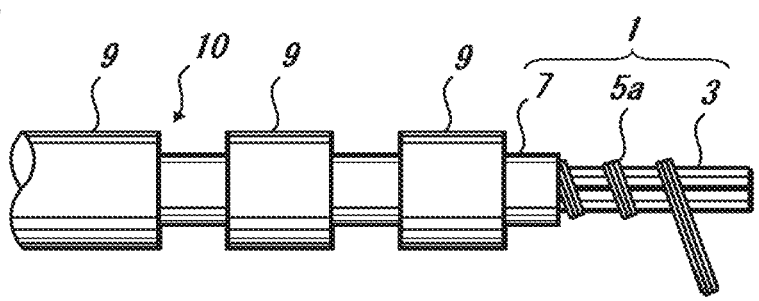
FIG. 12 is a diagram showing another embodiment of the present invention being a partial cutaway side view showing a configuration of a cord-shaped heater.

When forming the thermal fusion bonding portion 9 on the outer circumference of the heating wire 1, in addition to forming the thermal fusion bonding portion on an entire outer circumference of the heating wire, various aspects of the thermal fusion bonding portion are conceivable such as forming the thermal fusion bonding portion in a linear shape or a spiral linear shape along a length direction of the cord-shaped heater, forming the thermal fusion bonding portion in a dotted pattern, or intermittently forming the thermal fusion bonding portion as shown in FIG. 12. In doing so, making the thermal fusion bonding portion discontinuous in the length direction of the cord-shaped heater is preferable since, even when a part of the thermal fusion bonding portion ignites, the ignited part does not spread. In addition, if a volume of the thermal fusion bonding portion is sufficiently small, even when the thermal fusion bonding portion is made of a combustible material, a flame is extinguished in no time due to a lack of burning material and, furthermore, dripping (burning drops) no longer occurs. Therefore, the volume of the thermal fusion bonding portion is preferably a minimum volume necessary for retaining adhesion with the base material. However, in such aspects, the insulator layer 7 or the insulating film 5b is preferably made of a flame-retardant material.

As a material that constitutes the thermal fusion bonding portion 9, a flame-retardant polymer composition is preferably used. A flame-retardant polymer composition described herein refers to polymer compositions with an oxygen index of 21 or higher according to the Determination of Burning Behaviour as set forth in JIS-K7201 (1999). Polymer compositions with an oxygen index of 26 or higher are particularly preferable. Examples of specific materials include thermoplastic polymeric materials such as an olefin-based resin, a polyester-based resin, a polyamide-based resin, vinyl chloride resin, polyurethane resin, modified Noryl resin (polyphenylene oxide resin), aliphatic polyamide resin, polystyrene resin, a polyolefin-based thermoplastic elastomer, a polyester-based thermoplastic elastomer, a polyurethane-based thermoplastic elastomer, a polyamide-based thermoplastic elastomer, and materials obtained by appropriately blending a flame retardant into such thermoplastic polymeric materials. In addition, examples of olefin-based resins include high-density polyethylene, low-density polyethylene, ultra-low-density polyethylene, linear low-density polyethylene, polypropylene, polybutene, an ethylene-α-olefin copolymer, and an ethylene-unsaturated ester copolymer. Examples of an ethylene-unsaturated ester copolymer include an ethylene-vinyl acetate copolymer, an ethylene-methyl (meth)acrylate copolymer, an ethylene-ethyl (meth)acrylate copolymer, and an ethylene-butyl (meth)acrylate copolymer which can be used independently or a mixture of two or more of these copolymers may be used. In this case, "(meth)acrylate" represents both acrylate and methacrylate. While polyester-based thermoplastic elastomers include a polyester-polyester type and a polyester-polyether type, the polyester-polyether type has higher adhesion and is therefore preferable. Aliphatic polyamide resins are called nylons which include n-nylon that is synthesized by a polycondensation reaction of an ω-amino acid and n,m-nylon that is synthesized by a copolycondensation reaction of a diamine and a dicarboxylic acid. Examples of n-nylon include nylon 6, nylon 11, and nylon 12, and examples of n,m-nylon include nylon 66, nylon 610, nylon 61, nylon 6T, nylon 9T, and nylon MST. As a polyamide-based thermoplastic elastomer, a block copolymer using polyamide as a hard segment and polyether as a soft segment is known. Various examples of polyamide to be used as the hard segment is conceivable including aromatic polyamides such as para-aramid and meta-aramid in addition to the aliphatic poly amides described earlier. Various examples of polyether to be used as the soft segment is conceivable including polyalkylene ether glycols such as polyethylene glycol, poly(1,2- and 1,3-)propylene ether glycols, polytetramethylene ether glycol, and polyhexamethylene ether glycol, block or random copolymers of ethylene oxide and propylene oxide, block or random copolymers of ethylene oxide and tetrahydrofuran, and polyethers containing dihydric phenol such as bisphenol A and hydroquinone. Among the above, a polyamide-based thermoplastic elastomer with particularly superior adhesion at high temperatures and which provides good compatibility in terms of a melting point and adhesion when using a nonwoven fabric made of polyester fibers as the base material is preferable, a block copolymer of an aliphatic polyamide and a polyalkylene ether glycol is more preferable, and a block copolymer of nylon 11 or nylon 12 and a polytetramethylene ether glycol is particularly favorable. While a material may be optionally selected from these materials, the selected material preferably melts at a temperature equal to or lower than a kickoff temperature or a temperature equal to or lower than a melting point of the material that constitutes the insulating film 5b or the insulator layer 7 described above. In addition, an example of a material with superior adhesion with the base material is a polyester-based thermoplastic elastomer. Furthermore, in order to realize easy bonding with the base material and to secure adhesion strength after the bonding, a melt flow rate of the material constituting the thermal fusion bonding portion 9 is preferably 5.0 cm³/10 minutes or higher. The melt flow rate is measured at a temperature of 200° C. and under a load of 2.16 kg according to Method A as described in JIS K 7210: 1999. Examples of the flame retardant include a metal hydrate such as magnesium hydroxide and aluminum hydroxide, antimony oxide, melamine compounds, phosphorus-based compounds, chlorine-based flame retardants, and bromine-based flame retardants. Surface treatment may be appropriately applied to these flame retardants using known methods. In particular, surface treatment which lowers viscosity during melting of the polymer composition that constitutes the thermal fusion bonding portion 9 is preferable. In addition, the method of forming the thermal fusion bonding portion 9 is not particularly limited and, for example, the thermal fusion bonding portion 9 may be formed by known extrusion or by application. Note that, in the present invention, adhesion strength between the cord-shaped heater and the base material is particularly important. When the adhesion strength is insufficient, since the base material and the cord-shaped heater become separated through repetitive use and, as a result, unintended bending is applied to the cord-shaped heater, there is a possibility of breaking of the conductor strands.

In addition, when using a cord-shaped heater similar to that shown in FIG. 3, a good conductor of electricity such as a metal foil can be wound around an outer circumference of the conductor strands 5*a* in a portion in a length direction. Furthermore, when using a cord-shaped heater similar to that shown in FIG. 3, a good conductor of electricity such as a metal foil can be wound around an outer circumference of the heater core 3 (an inner surface of the conductor strands 5*a*) in a portion in the length direction. As a result, since electricity is conducted through the good conductor of electricity but hardly through the conductor strands 5*a* in the portion where the good conductor of electricity is wound, heat generation no longer occurs in this portion. Therefore, a good conductor of electricity is conceivably wound as described above in a portion where heat generation need not Occur. Furthermore, winding a good conductor of electricity as described above around an end portion of the cord-shaped heater makes the portion a lead wire portion. Therefore, since a heat generation portion and the lead wire portion are to be formed in a continuous manner, waterproofing is to be realized without having to perform a special treatment for connection or waterproofing. As a result, such a configuration is suitably used in applications where a waterproofing property is required such as a humid environment, an environment exposed to splashing water, or an environment where de-icing is performed.

In addition to providing one cord-shaped heater 10, two or more cord-shaped heaters 10 may be arranged. In such a case, one cord-shaped heater and the other cord-shaped heater may be arranged on a same surface of the base material or on different surfaces of the base material. Furthermore, a cord-shaped sensor may conceivably be arranged together with the cord-shaped heater. As the cord-shaped sensor, a cord-shaped sensor obtained by replacing heating strands with detecting strands in a cord-shaped heater such as that described above is conceivable. Conceivable examples of the cord-shaped sensor include a temperature sensor which measures a change in a resistance value due to a temperature of the detecting strands, a temperature sensor which detects conduction through the detecting strands due to melting of an insulation material that melts at a predetermined temperature, a grip sensor or a seating sensor which measures a change in capacitance of the detecting strands, and a pressure sensor or a load sensor which detects or measures tension or a displacement of the detecting strands. The cord-shaped sensor may similarly be arranged on a same surface of the base material as the cord-shaped heater or on a different surface of the base material from the cord-shaped heater.

As the base material 11, a base material that combines the structural yarn 11*a* arranged in an approximately planar shape and the nonwoven fabric 11*b* is used. As the structural yarn 11*a*, structural yarns of various modes such as a multifilament, a monofilament, and a spun yarn can be used. Among these modes, a multifilament is preferable due to superior flexibility and strength. While an apparent diameter of the structural yarn may be appropriately set in accordance with a usage environment of the heater unit 31 or the like, the apparent diameter preferably ranges from 0.25 mm to 1 mm from the perspectives of flexibility, mechanical strength, and ventilation characteristics. Note that the apparent diameter of the structural yarn is a value which is obtained by an actual measurement and which includes gaps between fibers that make up the structural yarn, and the apparent diameter can be approximately calculated according to the following equation.

$$D=0.0357\times\{T/(\rho\times\varphi)\}0.5$$

D: apparent diameter of structural yarn (mm)
T: thickness of structural yarn (tex)
$\rho$: density of fibers constituting structural yarn (g/cm³)
$\varphi$: fill factor of structural yarn (ratio of apparent density of structural yarn to density of fibers)

Various types of materials can be used as the material that constitutes the structural yarn 11*a* and examples thereof include inorganic fibers such as a glass fiber, an alumina fiber, a silica fiber, an alumina-silica fiber, and a carbon fiber, polyester fibers such as a polyethylene terephthalate fiber, a polyethylene naphthalate fiber, and a polybutylene telephthalate fiber, synthetic fibers such as a polyvinyl alcohol fiber, a polyvinyl chloride fiber, a polyvinylidene chloride fiber, a polyethylene fiber, a polypropylene fiber, a polyacrylonitrile fiber, a polystyrene fiber, a polyurethane fiber, a polyphenylene sulfide fiber, an aramid fiber, a nylon fiber, a polyether sulfone fiber, a polyether ketone fiber, and an ethylene tetrafluoride fiber, and natural fibers such as cotton, hemp, flax, silk, and sheep's wool. In addition, fibers with a sheath-core structure in which a sheath made of a low-melting point material is formed on an outer circumference of a core made of a high-melting point material may be used. These materials may be appropriately selected in consideration of usage conditions or the like. Obviously, the structural yarn 11*a* may be made of fibers of a single type or fibers of a plurality of types may be combined to form the structural yarn 11*a*.

Conceivable examples of a mode in which the structural yarn 11*a* is disposed in an approximately planar shape include disposing the structural yarn 11*a* in a serpentine shape, paralleling a plurality of the structural yarns 11*a* while separating the structural yarns 11*a* at predetermined intervals, paralleling a plurality of the structural yarns 11*a* while separating the structural yarns 11*a* at predetermined intervals and then stacking the paralleled structural yarns 11*a* in a plurality of layers such that respective parallel alignment directions differ from each other, weaving the structural yarns 11*a* (for example, plain weave, twill weave, and sateen weave), and knitting the structural yarns 11*a* (for example, plain stitch, rib stitch, purl stitch, interlock stitch, moss stitch, jacquard stitch, raschel stitch, and tricot stitch). In particular, weaving the structural yarn 11*a* so that the opening portion 11c thereof is larger than the apparent diameter of the structural yarn 11a or knitting the structural yarn 11a so that the opening portion 11c thereof is larger than the apparent diameter of the structural yarn 11a enables sufficient ventilation characteristics to be provided by the opening portion 11c. Furthermore, due to a structure created by weaving or knitting, displacement of the structural yarn 11a can be prevented even when subjected to an external force. As the size of the opening portion 11c, for example, the opening portion 11c is preferably around 10 to 30 times the apparent diameter of the structural yarn 11a. Note that the size of the opening portion 11c is obtained in a portion where the diameter of the opening portion 11c is maximized and, for example, when the opening portion 11c is a quadrate, a length of a diagonal is adopted as the size of the opening portion 11c. In addition, from another perspective, the shielding ratio of the structural yarn 11a preferably ranges from 8.8 to 23.2%. The shielding ratio refers to a percentage of an area occupied by the structural yarn 11a in a unit area and, when the apparent diameter of the structural yarn 11a is constant, the larger the size of the opening portion 11c, the lower the shielding ratio, but when the size of the opening portion 11c is constant, the larger the apparent diameter of the structural yarn 11a, the higher the shielding ratio.

Figure 13:
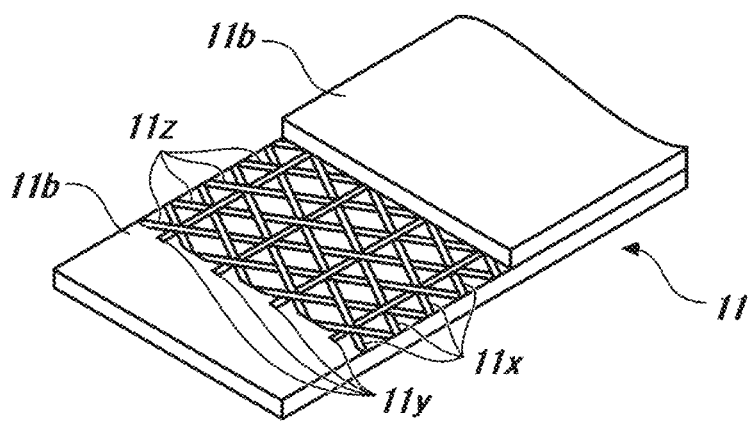
FIG. 13 is a diagram showing another embodiment of the present invention being a partial cutaway perspective view showing a configuration of a base material according to another mode.

While an angle formed between the first structural yarn group 11x and the second structural yarn group 11y is 90 degrees in the embodiment described above, it is obvious that the angle may be other than 90 degrees. However, since sufficient mechanical strength with respect to a predetermined direction may not be secured when the angle is too small, the angle is preferably 45 degrees or more. In addition, besides the first structural yarn group 11x and the second structural yarn group fly, a third structural yarn group, a fourth structural yarn group, and the like at different angles may be further used. For example, as shown in FIG. 13, the base material 11 is also conceivable in which the first structural yarn group 11x, the second structural yarn group 11y, and a third structural yarn group 11z which are disposed at 60-degree intervals. In the case of an aspect such as that shown in FIG. 13, while the linear portions 10a of the cord-shaped heater 10 may be disposed at an angle which differs from all of the angles of the first structural yarn group 11x, the second structural yarn group 11y, and the third structural yarn group 11z, an advantageous effect of the present invention can be sufficiently produced as long as the linear portions 10a of the cord-shaped heater 10 are disposed at an angle which differs from two of the angles of the first structural yarn group 11x, the second structural yarn group 11y, and the third structural yarn group 11z.

As the nonwoven fabric 11b, a nonwoven fabric formed by various methods such as a wetlaid method, a thermal bond method, a chemical bond method, a needle punch method, and a spun lace method is conceivable. Various types of materials can be used as the fibers that constitute the nonwoven fabric 11b and examples thereof include inorganic fibers such as a glass fiber, an alumina fiber, a silica fiber, an alumina-silica fiber, and a carbon fiber, polyester fibers such as a polyethylene terephthalate fiber, a polyethylene naphthalate fiber, and a polybutylene telephthalate fiber, synthetic fibers such as a polyvinyl alcohol fiber, a polyvinyl chloride fiber, a polyvinylidene chloride fiber, a polyethylene fiber, a polypropylene fiber, a polyacrylonitrile fiber, a polystyrene fiber, a polyurethane fiber, a polyphenylene sulfide fiber, an aramid fiber, a nylon fiber, a polyether sulfone fiber, a polyether ketone fiber, and an ethylene tetrafluoride fiber, and natural fibers such as cotton, hemp, flax, silk, and sheep's wool. In addition, thermally fusible fibers with a sheath-core structure in which a sheath made of a low-melting point material is formed on an outer circumference of a core made of a high-melting point material may be used. By using such a thermally fusible fiber when the thermal fusion bonding portion 9 is formed in an outermost layer of the cord-shaped heater 10, since the sheath portion of the thermally fusible fiber and the thermal fusion bonding portion 9 become thermally fused and integrated with each other in a state where the core portion of the thermally fusible fiber is surrounded, extremely tight bonding between the cord-shaped heater 10 and the base material 11 is realized. These fibers may be appropriately selected in consideration of usage conditions or the like. Obviously, the nonwoven fabric 11b may be made of fibers of a single type or fibers of a plurality of types may be combined to form a hybrid nonwoven fabric 11b. In addition, as the fibers that constitute the nonwoven fabric 11b, a filament (long fiber) without a fiber length may be used or a staple (short fiber) having a predetermined fiber length may be used. A filament is more preferable since a filament produces higher strength as the nonwoven fabric 11b and enables the cord-shaped heater 10 to be reliably fixed. Furthermore, as the base material 11, a base material with sufficient flame retardancy to pass FMVSS No. 302, test for Flammability of Interior Materials is preferable. FMVSS stands for the Federal Motor Vehicle Safety Standard and a flammability test for interior materials of motor vehicles is stipulated therein as Standard No. 302. To this end, as the fibers that constitute the structural yarn 11a and the nonwoven fabric 11b, a flame-retardant fiber capable of passing a flame retardancy test (for example, JIS-L1091: 1999) is preferably used. Using such a flame-retardant fiber imparts superior flame retardancy to the base material. A thickness (a value measured when dry) of the nonwoven fabric 11b is desirably set to, for example, around 0.6 mm to 1.4 mm. This is because when bonding and fixing the cord-shaped heater 10 and the base material 11 to each other by heating and pressurization, using the nonwoven fabric 11b with such a thickness enables the nonwoven fabric 11b to favorably bond to 30% or more and preferably bond to 50% or more of the outer circumference of the cord-shaped heater and, accordingly, a tight bonding state can be produced. In addition, a basis weight (a weight per a unit area) of the nonwoven fabric 11b is desirably set to around 80 to 120 g/m$^2$ for the base material 11 as a whole. The nonwoven fabric 11b with such a basis weight can provide superior ventilation characteristics and sufficient mechanical strength.

When thermally fusible fibers are to be used in the nonwoven fabric 11b, a mixing ratio of the thermally fusible fibers is preferably 5% or higher and preferably 20% or lower. When the mixing ratio of the thermally fusible fibers is lower than 5%, sufficient adhesion cannot be obtained. On the other hand, when the mixing ratio of the thermally fusible fibers is higher than 20%, the nonwoven fabric hardens and may not only cause a seated person to feel a sense of discomfort but may also cause a decline in adhesion with the cord-shaped heater. A mixing ratio of flame-retardant fibers is 70% or higher and preferably 70% or higher and 95% or lower. When the mixing ratio of the flame-retardant fibers is lower than 70%, sufficient flame retardancy may not be obtained. On the other hand, when the mixing ratio of the flame-retardant fibers exceeds 95%, the mixing ratio of the thermally fusible fibers becomes relatively deficient and sufficient adhesion cannot be obtained. Note that a sum of the mixing ratio of the thermally fusible fibers and the mixing ratio of the flame-retardant fibers need not be 100% and other fibers may be mixed as appropriate.

In addition, fibers that constitute the nonwoven fabric 11b may conceivably be colored. For example, in a case of the vehicular seat 41 using artificial leather or natural leather as the material of the seat cover 43, since these materials lack ventilation characteristics, a plurality of through-holes are to be formed in the seat cover 43 in order to impart ventilation characteristics. When the heater unit 31 is disposed inside the vehicular seat 41 described above, the heater unit 31 is to be visible from the through-holes. Therefore, the fibers that constitute the nonwoven fabric 11b are preferably colored in black or a similar type of color as the seat cover to make the nonwoven fabric 11b as inconspicuous as possible. It is also obvious that, conceivably, the structural yarn 11a and the cord-shaped heater 10 may be colored in black or a similar type of color as the seat cover.

As a mode which combines the structural yarn 11a and the nonwoven fabric 11b, for example, a mode in which the structural yarn 11a disposed in a planar shape is pasted on one surface of the nonwoven fabric 11b and a mode in which the structural yarn 11a disposed in a planar shape is sandwiched between a pair of the nonwoven fabric 11b are conceivable. In doing so, for example, the structural yarn 11a and the nonwoven fabric 11b are conceivably pasted together by an adhesive. In addition, when using a pair of the nonwoven fabric 11b, the sheets of the nonwoven fabric 11b are conceivably pasted together by an adhesive. While various types of adhesives are known and an adhesive may be appropriately selected in consideration of compatibility with the structural yarn 11a or the nonwoven fabric 11b, an adhesive which takes VOC into consideration is preferably selected in light of recent environmental circumstances. Furthermore, using a thermoplastic resin as the material of the fibers of the structural yarn 11a and/or the nonwoven fabric 11b enables the structural yarn 11a and the nonwoven fabric 11b or sheets of the nonwoven fabric 11b to be pasted together by applying heat and pressure under suitable conditions in a state where the structural yarn 11a and the nonwoven fabric 11b are stacked on top of each other. Specifically, for example, a method of using a press hot plate such as that described earlier or a method involving passing between heating rolls may be used.

In addition, when using a pair of the nonwoven fabric 11b, each of the pair may be made of a different material. For example, the following modes are conceivable. As one of the sheets of the nonwoven fabric 11b, a nonwoven fabric with a high degree of porosity or, in other words, a small amount of fiber per a unit volume is conceivably selected. By selecting a nonwoven fabric with a high degree of porosity as the nonwoven fabric 11b on the side where the cord-shaped heater 10 is to be present on a heater unit surface enables the cord-shaped heater 10 to more reliably penetrate into the nonwoven fabric 11b and the heater unit 31 with a flat shape can be obtained. Furthermore, a nonwoven fabric with a high degree of porosity may be selected as the nonwoven fabric 11b and the nonwoven fabric 11b may be fused with and filled by another resin to create a composite material. In addition, the heater unit 31 imparted with additional functions can be realized by combining various types of nonwoven fabric including a nonwoven fabric with superior flame retardancy, a nonwoven fabric with high tensile strength, a nonwoven fabric with superior chemical resistance, a nonwoven fabric with superior heat resistance, a nonwoven fabric with superior voltage resistance characteristics, a nonwoven fabric with electromagnetic wave shielding characteristics, a nonwoven fabric with low resilience, a nonwoven fabric with superior low temperature brittleness, and a nonwoven fabric with high (or low) thermal conductivity.

In addition, as far as an adhesion layer for fixing the heater unit 31 to a seat is concerned, the adhesion layer is preferably formed by forming an adhesion layer solely constituted of an adhesive on a release sheet or the like and transferring the adhesion layer onto a surface of the base material 11 from the release sheet when considering stretchability of the base material 11 or the retention of a high-quality texture. Furthermore, as the adhesion layer, an adhesion layer with flame retardancy is preferable and an adhesion layer with sufficient flame retardancy to pass FMVSS No. 302, Flammability of Interior Materials by itself is more preferable. Examples include an acrylic polymer pressure sensitive adhesive.

In addition, when arranging the cord-shaped heater 10 on the base material 11, instead of an aspect in which the cord-shaped heater 10 is bonded and fixed to the base material 11 due to thermal fusion by applying heat and pressure, the cord-shaped heater 10 may be fixed to the base material 11 by other aspects. For example, the cord-shaped heater 10 may be fixed to the base material 11 by sewing, the cord-shaped heater 10 may be fixed to the base material 11 by sandwiching and fixing the cord-shaped heater 10 with a pair of the base material 11 with adhesive backing, or another aspect may be used. When fixing the cord-shaped heater 10 to the base material 11, an aspect in which the cord-shaped heater 10 is fixed in direct contact with the structural yarn 11a of the base material 11 is preferable. When fixing the cord-shaped heater 10 to the base material 11 by sewing, for example, conceivably, the base material 11 with the structural yarn 11a disposed on a surface thereof or the base material 11 including the nonwoven fabric 11b with sufficiently low density (basis weight) may be used so that the cord-shaped heater 10 and the structural yarn 11a come sufficiently close to each other, and the cord-shaped heater 10 and the structural yarn 11a may be tightened and brought into contact with each other by sewing.

An arrangement of a serpentine shape in the cord-shaped heater 10 may also be designed in a predetermined shape by appropriately combining the linear portions 10a and the curved portions 10b in accordance with an object to be heated, an installation location, or the like. While the linear portions 10a are preferably arranged to be at an angle that differs from the angles of the first structural yarn group 11x and the second structural yarn group 11y, all of the linear portions 10a need not satisfy this arrangement. A part of the linear portions 10a may be parallel to the first structural yarn group 11x or the second structural yarn group 11y. The advantageous effect of the present invention can be sufficiently produced as long as 50% or more regions among the linear portions 10a of the disposed cord-shaped heater 10 are arranged to be at an angle that differs from the angles of the first structural yarn group 11x and the second structural yarn group 11y.

INDUSTRIAL APPLICABILITY

As described in detail above, according to the present invention, a heater unit with superior ventilation characteristics and mechanical strength can be obtained. The heater unit is suitably applicable as heating means that requires ventilation characteristics such as an electric blanket, an electrically heated carpet, a car seat heater, a steering wheel heater, a heated toilet seat, an antifog mirror heater, a cooking utensil, and a heater for floor panel heating.

REFERENCE SIGNS LIST

10 CORD-SHAPED HEATER
10a LINEAR PORTION
10b CURVED PORTION
11 BASE MATERIAL
11a STRUCTURAL YARN
11b NONWOVEN FABRIC
11c OPENING PORTION
11x FIRST STRUCTURAL YARN GROUP
11y SECOND STRUCTURAL YARN GROUP
31 HEATER UNIT
41 VEHICULAR SEAT

The invention claimed is:

1. A heater unit comprising: a base material; and a cord-shaped heater, the cord-shaped heater being disposed on and fixed to the base material, wherein
the base material is made by combining a structural yarn that is disposed in an approximately planar shape and a nonwoven fabric with each other, wherein the structural yarn is woven, or knitted, or parallel alignments of the structural yarn in different directions are stacked and the heater unit has an opening portion that is larger than an apparent diameter of the structural yarn, and
the cord-shaped heater is fixed in direct contact with the structural yarn.

2. The heater unit according to claim 1, wherein a thermal fusion bonding portion is formed on an outermost layer of the cord-shaped heater, and the thermal fusion bonding portion is fixed to the nonwoven fabric and the structural yarn by thermal fusion bonding.

3. The heater unit according to claim 1, wherein the base material is made of a structural yarn and a pair of a nonwoven fabric, and the structural yarn is sandwiched by the pair of the nonwoven fabric.

4. A vehicular seat comprising: a seat cover; and a seat pad, wherein the heater unit according to claim 1 is arranged between the seat cover and the seat pad.

5. A heater unit comprising: a base material; and a cord-shaped heater, the cord-shaped heater being disposed on and fixed to the base material, wherein
the base material is made by combining a plurality of structural yarns that are disposed in an approximately planar shape and a nonwoven fabric with each other,
the plurality of structural yarns is made up of at least a first structural yarn group that is linearly disposed with respect to a predetermined direction and a second structural yarn group that is linearly disposed with respect to a direction different from the direction of the first structural yarn group,
the cord-shaped heater is disposed on the base material in a serpentine shape created by a combination of linear portions and curved portions, and
the linear portions of the cord-shaped heater are arranged so as to assume an angle that differs from the angles of the first structural yarn group and the second structural yarn group.

6. The heater unit according to claim 5, wherein the structural yarn is woven or parallel alignments of the structural yarn in different directions are stacked and the heater unit has an opening portion larger than an apparent diameter of the structural yarn.

7. The heater unit according to claim 5, wherein the base material is made of a structural yarn and a pair of a nonwoven fabric, and the structural yarn is sandwiched by the pair of the nonwoven fabric.

8. The heater unit according to claim 5, wherein a thermal fusion bonding portion is formed on an outermost layer of the cord-shaped heater, and the thermal fusion bonding portion is fixed to the nonwoven fabric and the structural yarn by thermal fusion bonding.

9. A vehicular seat comprising: a seat cover; and a seat pad, wherein the heater unit according to claim 5 is arranged between the seat cover and the seat pad.

* * * * *